(12) United States Patent
Liu et al.

(10) Patent No.: US 9,561,963 B2
(45) Date of Patent: Feb. 7, 2017

(54) METHOD FOR MAKING COMPOSITE CARBON NANOTUBE STRUCTURE

(71) Applicants: Tsinghua University, Beijing (CN); HON HAI PRECISION INDUSTRY CO., LTD., New Taipei (TW)

(72) Inventors: Kai Liu, Beijing (CN); Kai-Li Jiang, Beijing (CN); Ying-Hui Sun, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/837,433

(22) Filed: Aug. 27, 2015

(65) Prior Publication Data

US 2015/0368107 A1    Dec. 24, 2015

Related U.S. Application Data

(62) Division of application No. 12/960,658, filed on Dec. 6, 2010.

(30) Foreign Application Priority Data

Jun. 29, 2010  (CN) .......................... 2010 1 0212390

(51) Int. Cl.
*C04B 35/00* (2006.01)
*C01B 31/02* (2006.01)
*C04B 35/83* (2006.01)
*C04B 35/52* (2006.01)
*C04B 35/626* (2006.01)
*B82Y 30/00* (2011.01)

(52) U.S. Cl.
CPC ............ *C01B 31/0253* (2013.01); *B82Y 30/00* (2013.01); *C04B 35/522* (2013.01); *C04B 35/6264* (2013.01); *C04B 35/6265* (2013.01); *C04B 35/6267* (2013.01); *C04B 35/6268* (2013.01); *C04B 35/83* (2013.01); *C04B 2235/48* (2013.01); *C04B 2235/5256* (2013.01); *C04B 2235/5288* (2013.01); *C04B 2235/616* (2013.01)

(58) Field of Classification Search
None
See application file for complete search history.

(56) References Cited

U.S. PATENT DOCUMENTS

| 2003/0000619 A1* | 1/2003 | Nakamura | ................ B60C 1/00 152/525 |
| 2004/0247873 A1* | 12/2004 | Gordeev | ............... C04B 35/573 428/408 |
| 2006/0098389 A1* | 5/2006 | Liu | ........................ B82Y 10/00 361/502 |

(Continued)

OTHER PUBLICATIONS

CN101250059, machine translation (2008).*

(Continued)

*Primary Examiner* — Robert Vetere
(74) *Attorney, Agent, or Firm* — Zhigang Ma

(57) ABSTRACT

A method for making a composite carbon nanotube structure is introduced. The method includes the following steps. A carbon nanotube structure and a polymer are provided. The polymer and the carbon nanotube structure are composited together. The composite carbon nanotube structure composited with polymer and the carbon nanotube is then graphitized.

9 Claims, 6 Drawing Sheets

(56) References Cited

U.S. PATENT DOCUMENTS

2009/0092813 A1* 4/2009 Lin ..................... B29C 70/885
428/220
2011/0068493 A1* 3/2011 Buyuktanir ...... B29D 11/00663
264/1.27

OTHER PUBLICATIONS

Andrews et al., "Carbon nanotube polymer composites", Current Opinion in Solid State and Materials Science 8, pp. 31-37 (2004).*

* cited by examiner

METHOD FOR MAKING COMPOSITE CARBON NANOTUBE STRUCTURE

RELATED APPLICATIONS

This application is a continuation of U.S. patent application Ser. No. 12/960658, filed on Dec. 6, 2010, "METHOD FOR MAKING COMPOSITE CARBON NANOTUBE STRUCTURE".

BACKGROUND

1. Technical Field

The present disclosure relates to a method for making a composite carbon nanotube structure.

2. Description of Related Art

Carbon nanotubes are tubules of carbon generally having a diameter of about 0.5 nanometers to about 100 nanometers, and composed of a number of coaxial cylinders of graphite sheets. Generally, the carbon nanotubes prepared by conventional methods are in particle or powder forms. The particle or powder-shaped carbon nanotubes limit the applications in which they can be used. Thus, preparation of macro-scale carbon nanotube structures, such as carbon nanotube wires, has attracted attention.

A carbon nanotube wire having a macro-scale carbon nanotube structure is directly drawn from a carbon nanotube array on a substrate. The carbon nanotube wire includes a plurality of successive carbon nanotubes substantially oriented along a same direction. The carbon nanotubes joined end to end by van der Waals attractive force therebetween.

However, the carbon nanotubes are only joined by the van der Waals attractive force therebetween, thus a mechanical strength of the carbon nanotube wire needs to be improved.

What is needed, therefore, is to provide a method for making a composite carbon nanotube structure, to overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
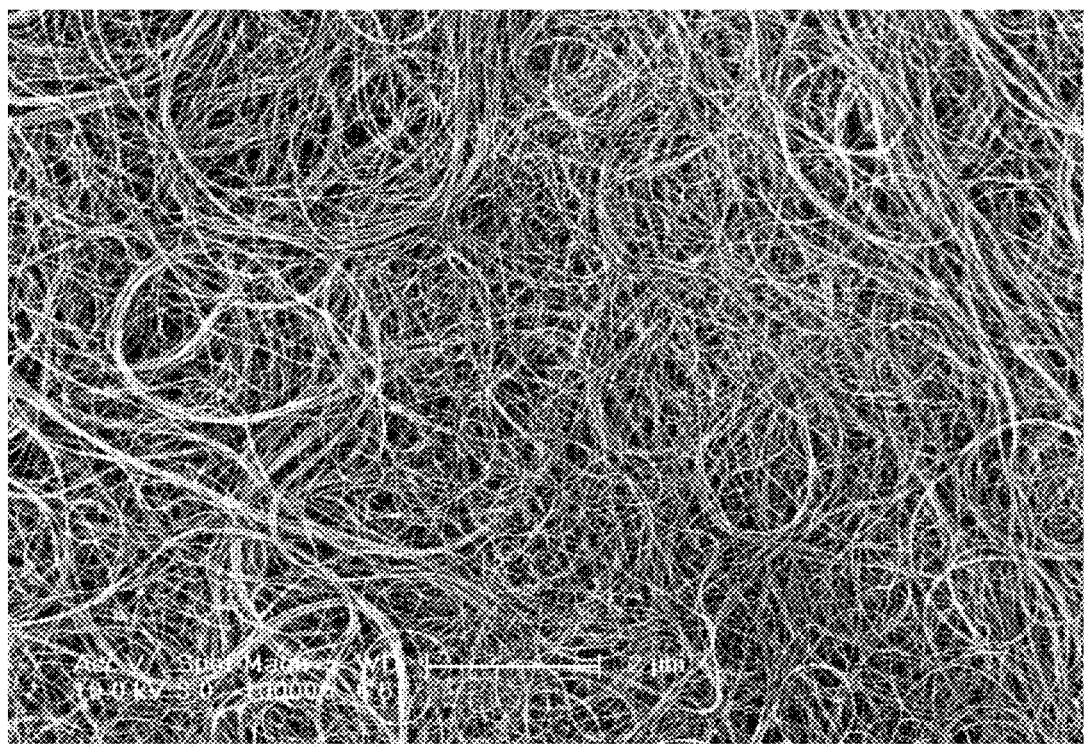
FIG. 1 shows a Scanning Electron Microscope (SEM) image of a flocculated carbon nanotube film.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

A method for making a composite carbon nanotube structure of one embodiment can include the following steps:

S10, providing a carbon nanotube structure and a polymer;

S20, compositing the carbon nanotube structure and the polymer; and

S30, graphitizing the polymer composited with the carbon nanotube structure.

In step S10, the carbon nanotube structure can be a planar structure, a linear structure, or other tridimensional structures. The carbon nanotube structure can be capable of forming a free-standing structure. The term "free-standing structure" can be defined as a structure that does not have to be supported by a substrate. For example, a free-standing structure can sustain the weight of itself when the free-standing structure is hoisted by a portion thereof without any significant damage to its structural integrity. The carbon nanotubes distributed in the carbon nanotube structure defines a plurality of gaps therebetween. An average gap can be in a range from about 0.2 nanometers to about 9 nanometers. The carbon nanotubes can have a significant van der Waals attractive force therebetween. The free-standing structure of the carbon nanotube structure is realized by the carbon nanotubes joined by van der Waals attractive force. So, if the carbon nanotube structure is placed between two separate supporters, a portion of the carbon nanotube structure, not in contact with the two supporters, would be suspended between the two supporters and yet maintain film structural integrity.

The carbon nanotube structure can includes a carbon nanotube film structure. The carbon nanotubes in the carbon nanotube film structure can be orderly or disorderly arranged. If the carbon nanotube structure includes a plurality of carbon nanotube film structures stacked together, adjacent carbon nanotube film structures can only be adhered by van der Waals attractive force therebetween.

The term 'disordered carbon nanotube film structure' includes, but is not limited to, a structure where the carbon nanotubes are arranged along many different directions such that the number of carbon nanotubes arranged along each different direction can be almost the same (e.g. uniformly disordered), and/or entangled with each other. 'Ordered carbon nanotube film structure' includes, but is not limited to, a structure where the carbon nanotubes are arranged in a consistently systematic manner, e.g., the carbon nanotubes are arranged approximately along a same direction and or have two or more sections within each of which the carbon nanotubes are arranged approximately along a same direction (different sections can have different directions). The carbon nanotubes in the carbon nanotube film structure can be single-walled, double-walled, and/or multi-walled carbon nanotubes.

Macroscopically, the carbon nanotube film structure may have a substantially planar structure. The planar carbon nanotube structure can have a thickness of about 0.5 nanometers to about 100 microns. The carbon nanotube film structure includes a plurality of carbon nanotubes and defines a plurality of intertube spaces from about 1 nanometer to about 500 nanometers. The intertube spaces can include spaces defined among the carbon nanotubes and spaces defined by the inner surfaces of the carbon nanotubes. The carbon nanotube film structure can include at least one carbon nanotube film, the at least one carbon nanotube film including a plurality of carbon nanotubes substantially parallel to a surface of the corresponding carbon nanotube film.

The carbon nanotube film structure can include a flocculated carbon nanotube film as shown in FIG. 1. The flocculated carbon nanotube film can include a plurality of long, curved, disordered carbon nanotubes entangled with each other and can form a free-standing structure. Further, the flocculated carbon nanotube film can be isotropic. The carbon nanotubes can be substantially uniformly dispersed in the carbon nanotube film. The adjacent carbon nanotubes are acted upon by the van der Waals attractive force therebetween Further, due to the carbon nanotubes in the carbon nanotube structure being entangled with each other, the carbon nanotube structure employing the flocculated carbon nanotube film has excellent durability, and can be fashioned into desired shapes with a low risk to the integrity of carbon nanotube structure. The flocculated carbon nanotube film, in some embodiments, will not require the use of structural support or due to the carbon nanotubes being entangled and adhered together by van der Waals attractive force therebetween. The flocculated carbon nanotube film can define a plurality of intertube spaces in a range from about 1 nanometer to about 500 nanometers. The intertube spaces defined in the flocculated carbon nanotube film can increase a special surface area of the flocculated carbon nanotube film. More polymer solution can be accommodated in the flocculated carbon nanotube film.

Figure 2:
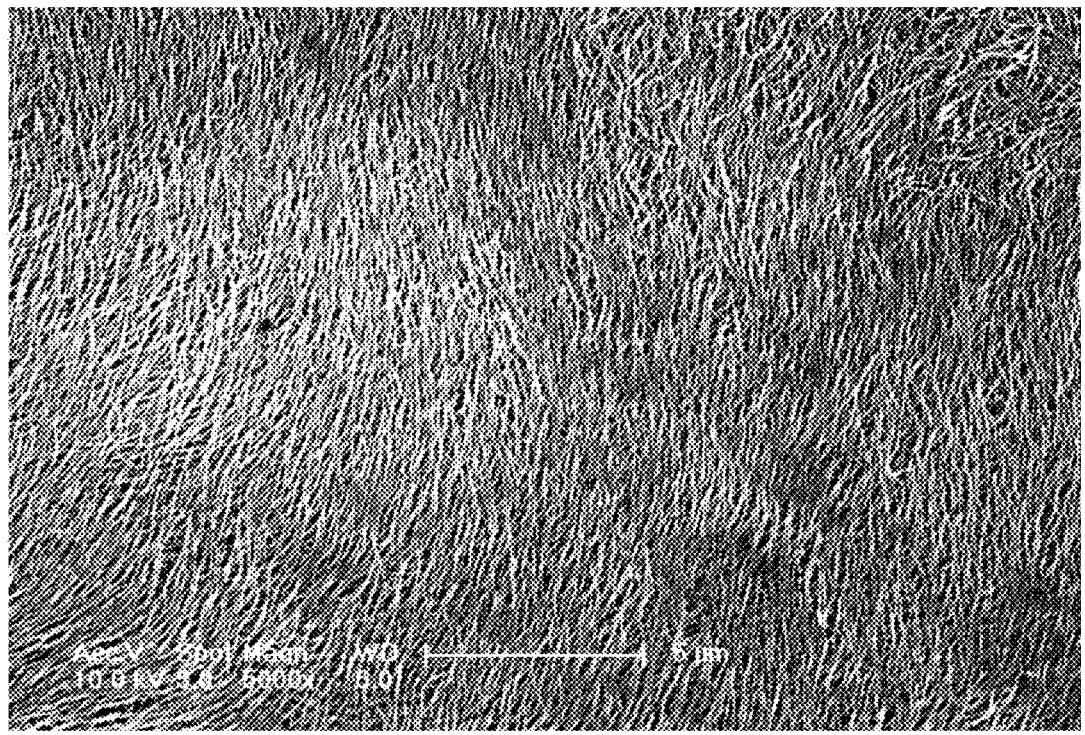
FIG. 2 shows an SEM image of a pressed carbon nanotube film.

The carbon nanotube film structure can include a pressed carbon nanotube film. The carbon nanotubes in the pressed carbon nanotube film can be arranged along a same direction or arranged along different directions. The carbon nanotubes in the pressed carbon nanotube film can rest upon each other. The adjacent carbon nanotubes are combined and attracted to each other by van der Waals attractive force, and can form a free-standing structure. An angle between a primary alignment direction of the carbon nanotubes and a surface of the pressed carbon nanotube film can be in a range from approximately 0 degrees to approximately 15 degrees. The pressed carbon nanotube film can be formed by pressing a carbon nanotube array. The angle is closely related to pressure applied to the carbon nanotube array. The greater the pressure, the smaller the angle. The carbon nanotubes in the carbon nanotube film are substantially parallel to the surface of the carbon nanotube film if the angle is about 0 degrees. A length and a width of the carbon nanotube film can be set as desired. The pressed carbon nanotube film can include a plurality of carbon nanotubes substantially aligned along one or more directions. The pressed carbon nanotube film can be obtained by pressing the carbon nanotube array with a pressure head. Alternatively, the shape of the pressure head and the pressing direction can determine the direction of the carbon nanotubes arranged therein. Specifically, in one embodiment, a planar pressure head is used to press the carbon nanotube array along the direction substantially perpendicular to a substrate. A plurality of carbon nanotubes pressed by the planar pressure head may be sloped in many directions. In another embodiment, as shown in FIG. 2, if a roller-shaped pressure head is used to press the carbon nanotube array along a certain direction, the pressed carbon nanotube film having a plurality of carbon nanotubes substantially aligned along the certain direction can be obtained. In another embodiment, if the roller-shaped pressure head is used to press the carbon nanotube array along different directions, the pressed carbon nanotube film having a plurality of carbon nanotubes substantially aligned along different directions can be obtained. The pressed carbon nanotube film can define a plurality of intertube spaces therein. The intertube spaces can in a range from about 1 nanometer to about 500 nanometers. The intertube spaces defined in the pressed carbon nanotube film can improve a special surface area of the pressed carbon nanotube film. More polymer solution can be accommodated in the flocculated carbon nanotube film.

Figure 3:
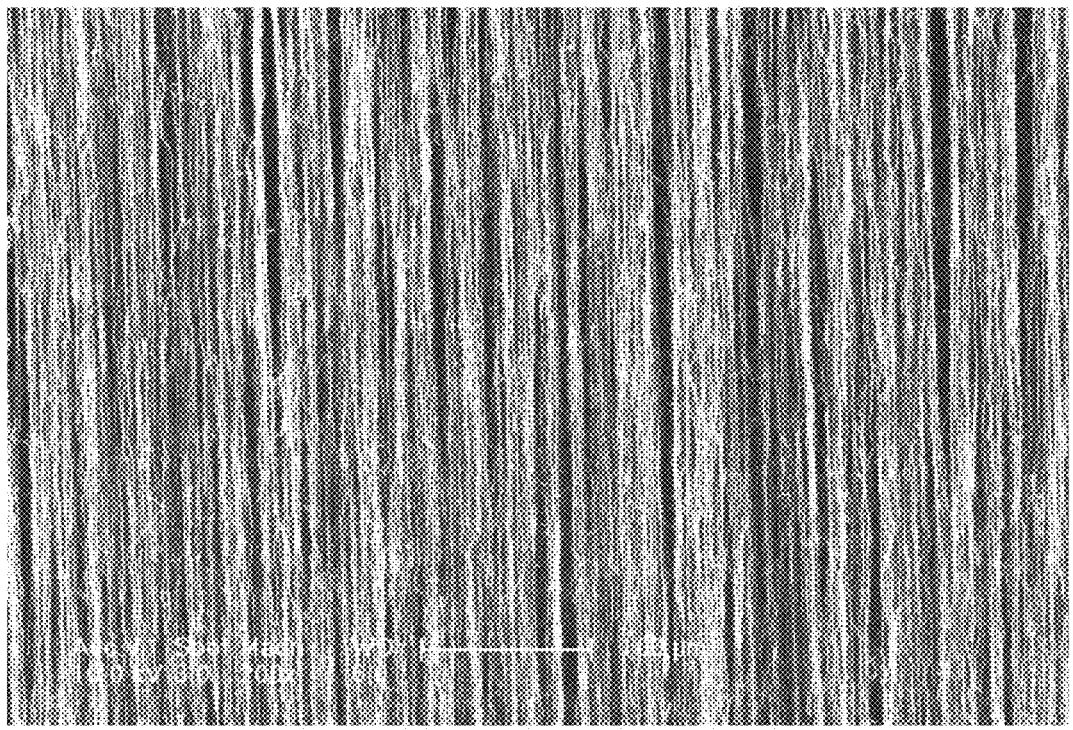
FIG. 3 shows an SEM image of a drawn carbon nanotube film.

In some embodiments, the carbon nanotube film structure includes at least one drawn carbon nanotube film as shown in FIG. 3. The drawn carbon nanotube film can have a thickness of about 0.5 nanometers to about 100 microns. The drawn carbon nanotube film includes a plurality of carbon nanotubes that can be arranged substantially parallel to a surface of the drawn carbon nanotube film. A plurality of intertube spaces in a range from about 1 nanometer to about 500 nanometers can be defined by the carbon nanotubes. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. More specifically, the drawn carbon nanotube film includes a plurality of successively oriented carbon nanotube segments joined end-to-end by van der Waals attractive force therebetween. Each carbon nanotube segment includes a plurality of carbon nanotubes substantially parallel to each other and joined by van der Waals attractive force therebetween. The carbon nanotube segments can vary in width, thickness, uniformity, and shape. A small number of the carbon nanotubes are randomly arranged in the drawn carbon nanotube film and has a small if not negligible effect on the larger number of the carbon nanotubes in the drawn carbon nanotube film arranged substantially along the same direction.

Understandably, some variation can occur in the orientation of the carbon nanotubes in the drawn carbon nanotube film as can be seen in FIG. 3. Microscopically, the carbon nanotubes oriented substantially along the same direction may not be perfectly aligned in a straight line, and some curve portions may exist. Furthermore, it can be understood that some carbon nanotubes are located substantially side by side and oriented along the same direction and in contact with each other.

Figure 4:
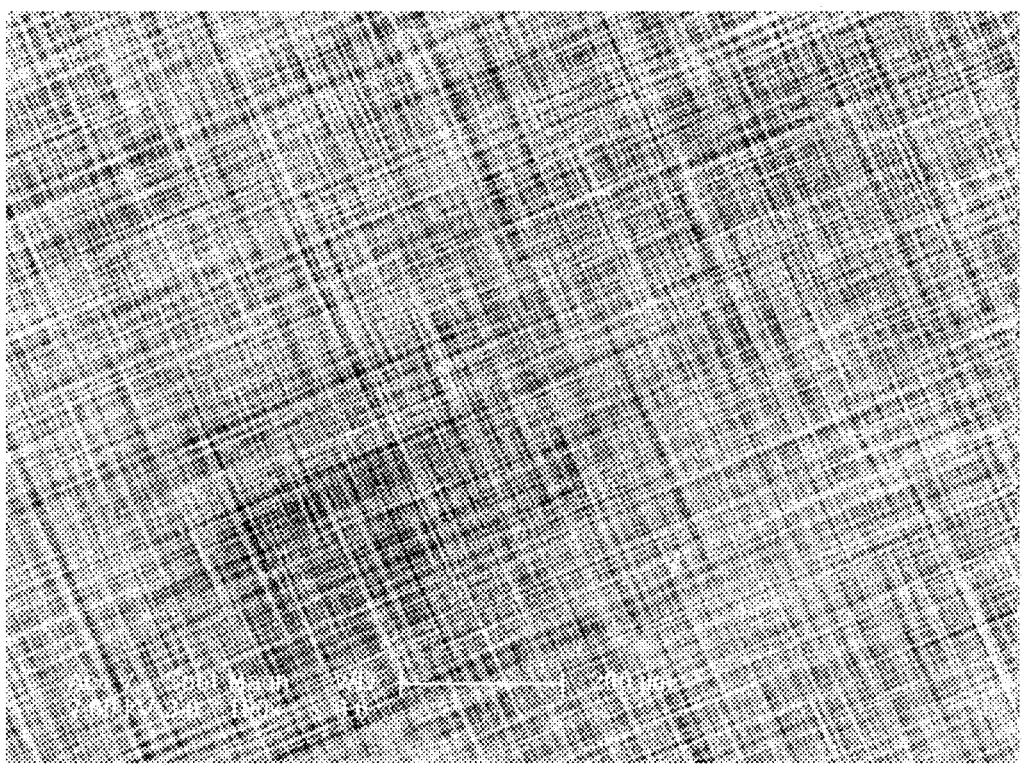
FIG. 4 shows an SEM image of a carbon nanotube structure consisting of a plurality of stacked drawn carbon nanotube films.

The carbon nanotube film structure can include a plurality of stacked drawn carbon nanotube films. Adjacent drawn carbon nanotube films can be adhered by only the van der Waals attractive force therebetween. An angle can exist between the carbon nanotubes in adjacent drawn carbon nanotube films. The angle between the aligned directions of the adjacent drawn carbon nanotube films can range from 0 degrees to about 90 degrees. In one embodiment, the angle between the aligned directions of the adjacent drawn carbon nanotube films is substantially 90 degrees as shown in FIG. 4. Simultaneously, aligned directions of adjacent drawn carbon nanotube films can be substantially perpendicular to each other, thus a plurality of intertube spaces and nodes can be defined by the carbon nanotube film structure. The carbon nanotube film structure including a plurality of uniform intertube spaces and nodes can form a nanoporous structure. The nanoporous structure can provide a huge surface area to accommodate more polymer therein.

The carbon nanotube structure can include a carbon nanotube wire. The carbon nanotube wire structure can include a plurality of carbon nanotubes joined end to end by van der Waals attractive force therebetween along an axial direction. A plurality of intertube spaces can be defined among the carbon nanotubes. The carbon nanotube structure can include a plurality of carbon nanotube wires. A plurality of intertube spaces can be defined among the carbon nanotube wires. The carbon nanotube wires can be substantially parallel to each other to form a bundle-like structure or twisted with each other to form a twisted structure. The plurality of carbon nanotube wires can also be woven together to form a woven structure. The bundle-like structure, the twisted structure, and the woven structure are three kinds of linear shaped carbon nanotube structure.

Figure 5:
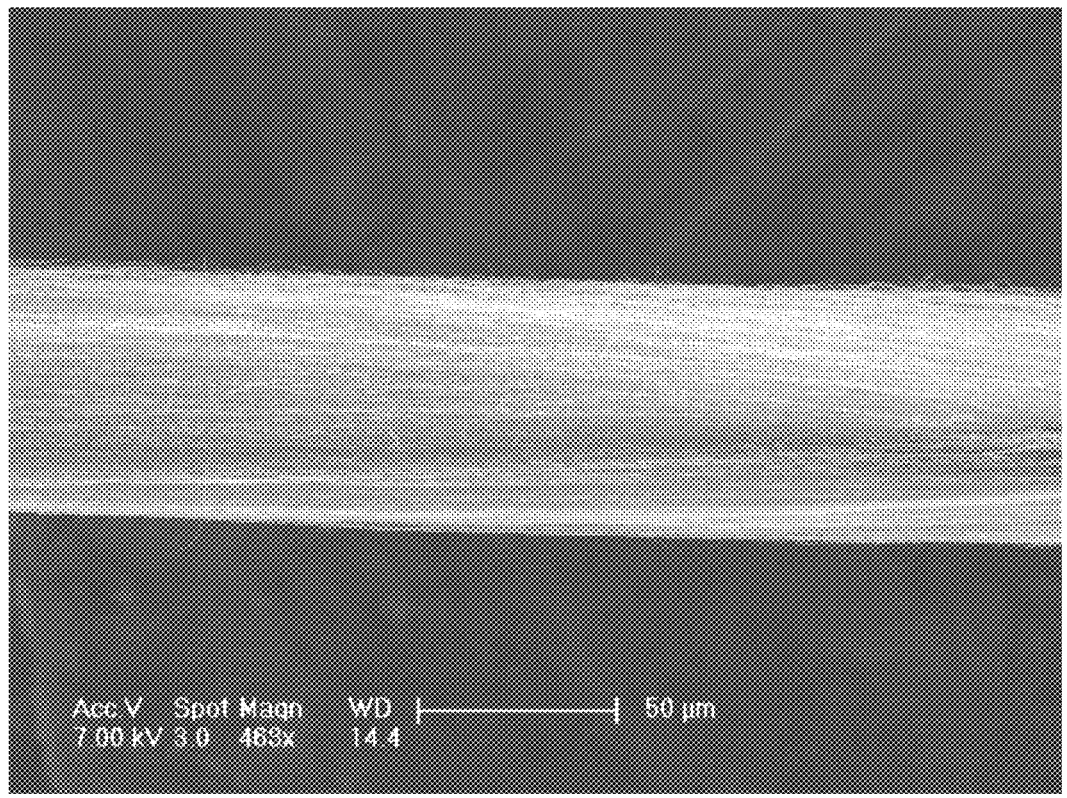
FIG. 5 shows an SEM image of an untwisted carbon nanotube wire.

The carbon nanotube wire can be untwisted or twisted. Treating the drawn carbon nanotube film with a volatile solvent can obtain the untwisted carbon nanotube wire. In one embodiment, the volatile solvent can be applied to soak the entire surface of the drawn carbon nanotube film. During the soaking, adjacent substantially parallel carbon nanotubes in the drawn carbon nanotube film will bundle together due to the surface tension of the volatile solvent as it volatilizes, and thus the drawn carbon nanotube film will be shrunk into an untwisted carbon nanotube wire. The untwisted carbon nanotube wire includes a plurality of carbon nanotubes substantially oriented along a same direction (i.e., a direction along the length direction of the untwisted carbon nanotube wire) as shown in FIG. 5. The carbon nanotubes are substantially parallel to the axis of the untwisted carbon nanotube wire. In one embodiment, the untwisted carbon nanotube wire includes a plurality of successive carbon nanotubes joined end to end by van der Waals attractive force therebetween. The length of the untwisted carbon nanotube wire can be arbitrarily set as desired. A diameter of the untwisted carbon nanotube wire ranges from about 0.5 nanometers to about 100 micrometers.

Figure 6:
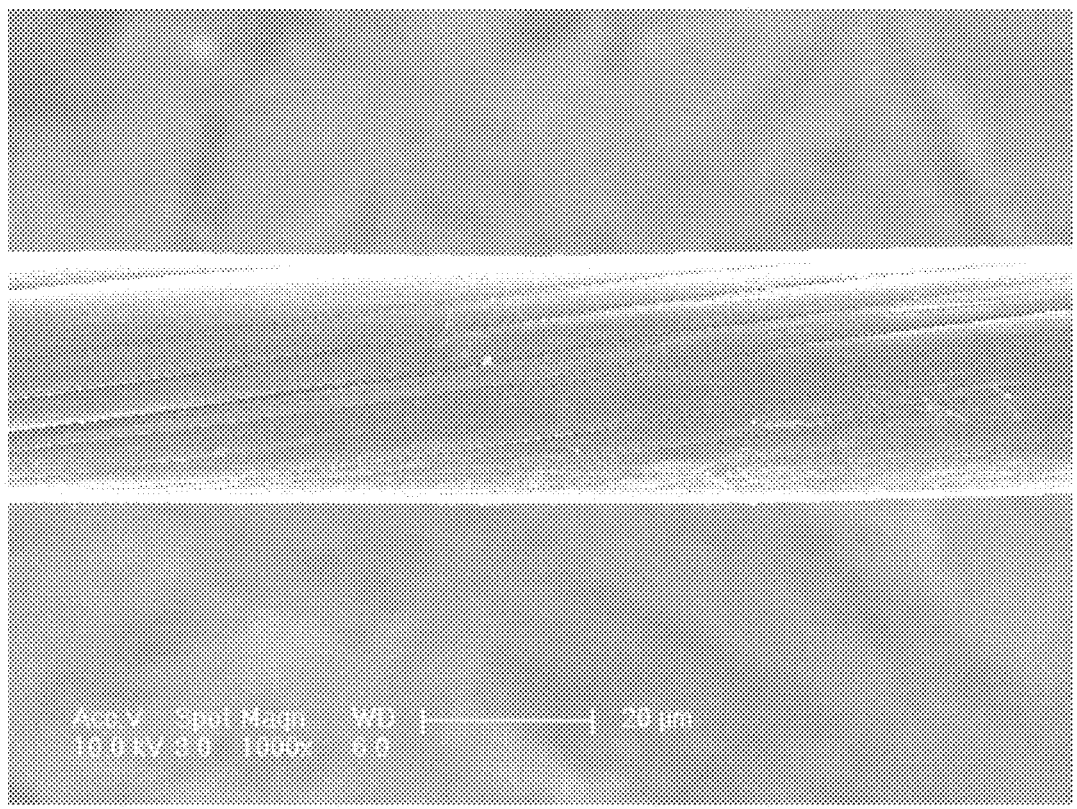
FIG. 6 shows an SEM image of a twisted carbon nanotube wire.

The twisted carbon nanotube wire can be obtained by twisting a drawn carbon nanotube film using a mechanical force to turn the two ends of the drawn carbon nanotube film in opposite directions. The twisted carbon nanotube wire includes a plurality of carbon nanotubes helically oriented around an axial direction of the twisted carbon nanotube wire as shown in FIG. 6. In one embodiment, the twisted carbon nanotube wire includes a plurality of successive carbon nanotubes joined end to end by van der Waals attractive force therebetween. The length of the carbon nanotube wire can be set as desired. A diameter of the twisted carbon nanotube wire can be from about 0.5 nanometers to about 100 micrometers.

The polymer can be polyacrylonitrile, polyvinyl alcohol (PVA), polypropylene (PP), polystyrene (PS), polyvinylchloride (PVC), polyethylene terephthalate (PET), or combinations thereof.

In step 20, when the carbon nanotube structure and the polymer are composited together, the intertube spaces of the carbon nanotube structure can be filled with the polymer. Means for compositing the carbon nanotube structure and the polymer are not limited. In one embodiment, the step 20 can further include the following steps:

S21, dissolving the polymer in an organic solvent to obtain a polymer solution; and S22, applying the carbon nanotube structure into the polymer solution to composite the carbon nanotube structure and the polymer.

In step 21, the organic solvent is configured to dissolve the polymer therein and soak the carbon nanotube structure. The contact angle between the organic solvent and the carbon nanotubes can be less than 90 degrees, thus the polymer solution can even soak the inner surfaces of the carbon nanotubes. The contact angle is the angle at which a liquid interface meets a solid surface. The contact angle is also a quantitative measure of a wetting of the solid by the liquid. Wettability between the organic solvent and the carbon nanotubes can be determined by the contact angle between the organic solvent and the carbon nanotubes. The less the contact angle, the better the soakage capability of the organic solvent and the better the wettability between the organic solvent and the carbon nanotubes. In one embodiment, the contact angle is less than 70 degrees. The organic solvent can have a surface tension greater than 20 millimeters per newton, thus, the organic solvent can shrink the carbon nanotube structure soaked therein. The greater the surface tension, the greater a shrinking strength of the organic solvent and the polymer solution, and the tighter the polymer adhering to the carbon nanotube structure. In one embodiment, the surface tension of the organic solvent is greater than or equal to about 40 millimeters per newton. The organic solvent can be dimethyl sulphoxide (DMSO), dimethyl formamide (DMF), 2, 5-dimethyl furan, N-methyl-2-pyrrolidone (NMP), or combinations thereof. In one embodiment, when the polymer is PVA, the organic solvent is DMSO. The contact angle between the DMSO and the carbon nanotubes is about 70 degrees. The surface tension of the DMSO is about 43.54 millimeters per newton.

A mass ratio between the polymer and the polymer solution can be moderate, thus more polymer in the polymer solution can infiltrate into the intertube spaces inside the carbon nanotube structure. In one embodiment, if the organic solvent is DMSO and the polymer is PVA, the mass ratio between the PVA and the polymer solution is in a range from about 1 percent to about 9 percent.

In step S22, when the carbon nanotube structure is soaked by the polymer solution, the organic solvent will wet the carbon nanotube structure. The polymer loaded by the organic solvent can infiltrate into the intertube spaces in the carbon nanotube structure and integrate with the carbon nanotube structure firmly. The polymer and the carbon nanotube structure can be combined by covalent bonds therebetween. The carbon nanotubes can be joined by the polymer and the van der Waals attractive force therebetween at the same time. The less the contact angle between the organic solvent, the more the polymer infiltrates into the intertube spaces and the firmer the polymer adheres to the carbon nanotubes.

In step S30, the polymer composited with the carbon nanotube structure can be graphitized to a graphite structure at a graphitizing temperature greater than or equal to 2000 degrees. In one embodiment, the graphite temperature is in a range from about 2500 degrees to about 3500 degrees. Means for graphitizing the polymer composited with the carbon nanotube structure is not limited. In one embodiment, the step 30 can further include the following steps:

S31, pre-oxidizing the polymer composited with the carbon nanotube structure; and S32, carbonizing the pre-oxidized polymer at the graphite temperature.

In step 31, a pre-oxidizing temperature of pre-oxidizing the polymer can be in a range from about 200 degrees to about 300 degrees.

In step 32, the carbonizing step can be performed in a vacuum chamber or in a chamber filled with inert gas so that less oxygen can react with carbon atoms of the pre-oxidized polymer or the carbon nanotubes. If the carbonizing step is taken in a vacuum chamber, a gas pressure of the vacuum chamber can be less than 0.05 Pa. In one embodiment, the gas pressure of the vacuum chamber is less than 0.00005 Pa to decrease the oxygen in the chamber. If the carbonizing step is taken in the chamber filled with inert gas, the inert gas can be nitrogen, argon, or neon. When the pre-oxidized polymer is heated to the graphite temperature and is carbonized at the graphite temperature for several minutes, the pre-oxidized polymer can be graphitized to the graphite structure. In one embodiment, the graphitizing temperature is in a range from about 2500 degrees to about 3500 degrees.

When the polymer composited with carbon nanotube structure is graphitized, most of the nitrogen, hydrogen, and oxygen of the polymer can be removed from the polymer, and carbon of the polymer can be retained to form the graphite structure. The covalent bonds between the polymer and the carbon nanotube structure can be graphitized to carbon-carbon bonds in the carbonizing step. The lattices of some carbon atoms of the polymer and the lattices of some carbon atoms carbon atoms of the carbon nanotube structure can be restructured in the carbonizing step to define a plurality of carbon-carbon bonds between the graphite structure and the carbon nanotube structure. Thus, the graphite structure and the carbon nanotube structure can be combined by carbon-carbon bonds therebetween to form the composite carbon nanotube structure in the carbonizing step. The carbon-carbon bonds can include $sp^2$ hybridized bonds or $sp^3$ hybridized bonds between the carbon atoms. In the composite carbon nanotube structure, the carbon nanotubes can not only be joined by the van der Waals attractive force therebetween, but also be integrated by the graphite structure, thus the composite carbon nanotube structure can have a mechanical strength greater than a mechanical strength of the carbon nanotube structure. The carbon-carbon bonds between the graphite structure and the carbon nanotube structure can further increase the mechanical strength of the composite carbon nanotube structure.

The graphite structure can include a plurality of graphene segments or a plurality of graphite fibers. The graphene segments can be combined by carbon-carbon bonds or van der Waals attractive force therebetween. The graphene segments can include a plurality of graphenes combined by carbon-carbon bonds therebetween. The graphite fibers can be combined by carbon-carbon bonds or van der Waals attractive force therebetween. A mass ratio between the graphene segments and the composite carbon nanotube structure, and a mass ratio between the graphite fibers and the composite carbon nanotube structure can be determined by the heating time for the pre-oxidized polymer from the pre-oxidizing temperature to the graphitizing temperature. If the time for heating the pre-oxidized polymer from the pre-oxidizing temperature to the graphitizing temperature is short, more graphene segments can be obtained and the mass ratio between the graphene segments and the composite carbon nanotube structure can be increased. If the time for heating the pre-oxidized polymer from the pre-oxidizing temperature to the graphitizing temperature is long, more graphite fibers can be obtained and the mass ratio between the graphite fibers and the composite carbon nanotube structure can be increased.

A mass ratio between graphene segments and the composite carbon nanotube structure, and a mass ratio between graphite fibers and the composite carbon nanotube structure can also be determined by a microstructure of the carbon nanotube structure. If most of the carbon nanotubes of the carbon nanotube structure are crossed and define a plurality of micropores having a size of about 1 nanometer to about 500 nanometers, more graphene segments can be obtained, and the mass ratio between the graphene segments and the composite carbon nanotube structure can be increased. The graphene segments can be received in the micropores and can be combined with the carbon nanotubes by carbon-carbon bonds therebetween. If most of the carbon nanotubes of the carbon nanotube structure are joined end by end and are aligned in substantially the same direction, more graphite fibers can be obtained, and the mass ratio between the graphite fibers and the composite carbon nanotube structure can be increased.

A composite carbon nanotube structure of one embodiment can include a carbon nanotube structure and a graphite structure composited with the carbon nanotube structure. The composite carbon nanotube structure can be fabricated by methods mentioned above.

In one embodiment, the carbon nanotube structure includes a carbon nanotube film structure including a plurality of carbon nanotubes. The carbon nanotube film structure can define a plurality of micropores having a size of about 1 nanometer to about 500 nanometers therein. The graphite structure can include a plurality of graphite segments. The graphite segments can be received in the micropores and can be combined with the carbon nanotubes with carbon-carbon bonds therebetween. The graphite segments received in the micropores can be adhered to or wrap the carbon nanotubes defining the micropores.

The graphite structure can also include two graphite layers attached to two opposite surfaces of the carbon nanotube film structure, thus a multi-layer structure can be obtained and the carbon nanotube film structure can be wrapped by the graphite structure. Macroscopically, the carbon nanotube film structure is embedded in the graphite structure and combined with the graphite structure by carbon-carbon bonds. In the multi-layer structure, the two graphite layers and the graphite segments received in the micropores are combined by carbon-carbon bonds therebetween to form the graphite structure.

In one embodiment, the carbon nanotube structure includes a carbon nanotube wire including a plurality of carbon nanotubes joined end to end by van der Waals attractive force therebetween along an axial direction. A plurality of intertube spaces can be defined among the carbon nanotubes. The graphite fibers can be received in the intertube spaces inside the carbon nanotube structure. The carbon nanotubes can be wrapped by the graphite fibers along the axial direction. The fibers can be substantially parallel to each other along the axial direction. The fibers can be combined by carbon-carbon bonds or van der Waals attractive force therebetween.

The carbon nanotubes of the composite carbon nanotube structure cannot only be joined by the van der Waals attractive force therebetween, but also can be integrated by the graphite structure. Thus, the composite carbon nanotube structure can have a mechanical strength greater than a mechanical strength of the carbon nanotube structure. Further, both the carbon nanotube structure and the graphite structure are made of carbon materials, so the density of the composite carbon nanotube structure can be small.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure.

The above-described embodiments illustrate the scope of the disclosure but do not restrict the scope of the disclosure.

What is claimed is:

1. A method for making a composite carbon nanotube structure, comprising:
   providing a carbon nanotube structure and a polymer, wherein the carbon nanotube structure comprises a plurality of carbon nanotube films stacked with each other, each of the plurality of carbon nanotube films comprise a plurality of carbon nanotubes joined end to end by along van der Waals attractive force and aligned along a same direction, and an angle formed between the aligned directions of the adjacent drawn carbon nanotube films ranges from about 0 degrees to about 90 degrees;
   dissolving the polymer in an organic solvent to obtain a polymer solution, wherein a surface tension of the organic solvent is greater than or equal to about 40 millimeters per Newton;
   applying the carbon nanotube structure into the polymer solution to composite the carbon nanotube structure and the polymer; and
   graphitizing the polymer composited with the carbon nanotube structure to obtain the composite carbon nanotube structure comprising a graphite structure, wherein the graphitizing the polymer comprises:
      pre-oxidizing the polymer composited with the carbon nanotube structure at a pre-oxidizing temperature to form a pre-oxidized polymer;
      heating the pre-oxidized polymer from the pre-oxidizing temperature to a graphitizing temperature; and
      carbonizing the pre-oxidized polymer composited with the carbon nanotube structure at the graphitizing temperature, wherein a mass ratio between the graphite structure and the composite carbon nanotube structure is controlled by a time of heating the pre-oxidized polymer from the pre-oxidizing temperature to the graphitizing temperature; wherein the mass ratio between the graphite structure and the composite carbon nanotube structure is increased by expanding the time of heating the pre-oxidized polymer from the pre-oxidizing temperature to the graphitizing temperature.

2. The method of claim 1, wherein a contact angle between the organic solvent and carbon nanotubes of the carbon nanotube structure is less than 90 degrees.

3. The method of claim 1, wherein the step of compositing the carbon nanotube structure and the polymer further comprises infiltrating the polymer into the carbon nanotube structure.

4. The method of claim 1, wherein the step of carbonizing the pre-oxidized polymer further comprises putting the pre-oxidized polymer in a vacuum chamber or in a chamber filled with inert gas.

5. The method of claim 1, wherein the plurality of carbon nanotubes substantially parallel to a surface of the carbon nanotube film.

6. The method of claim 1, wherein a mass ratio between the polymer and the polymer solution is in a range from about 1 percent to about 9 percent.

7. The method of claim 6, wherein the organic solvent is dimethyl sulphoxide, and the polymer is polyvinyl alcohol.

8. The method of claim 1, wherein the mass ratio between the graphite structure and the composite carbon nanotube structure is decreased by reducing the time of heating the pre-oxidized polymer from the pre-oxidizing temperature to the graphitizing temperature.

9. A method for making a composite carbon nanotube structure, comprising:
   providing a carbon nanotube structure and a polymer, wherein the carbon nanotube structure comprises a plurality of carbon nanotube films stacked with each other, each of the plurality of carbon nanotube films comprise a plurality of carbon nanotubes joined end to end by along van der Waals attractive force and aligned along a same direction, and an angle formed between the aligned directions of the adjacent drawn carbon nanotube films ranges from about 0 degrees to about 90 degrees;
   dissolving the polymer in an organic solvent to obtain a polymer solution, wherein a surface tension of the organic solvent is greater than or equal to about 40 millimeters per Newton;
   applying the carbon nanotube structure into the polymer solution to composite the carbon nanotube structure and the polymer; and
   graphitizing the polymer composited with the carbon nanotube structure to obtain the composite carbon nanotube structure comprising a graphite structure, wherein the graphitizing the polymer comprises:
      pre-oxidizing the polymer composited with the carbon nanotube structure at a pre-oxidizing temperature to form a pre-oxidized polymer;
      heating the pre-oxidized polymer from the pre-oxidizing temperature to a graphitizing temperature; and
      carbonizing the pre-oxidized polymer composited with the carbon nanotube structure at the graphitizing temperature, wherein a mass ratio between the graphite structure and the composite carbon nanotube structure is controlled by a time of heating the pre-oxidized polymer from the pre-oxidizing temperature to the graphitizing temperature; wherein the mass ratio between the graphite structure and the composite carbon nanotube structure is decreased by reducing the time of heating the pre-oxidized polymer from the pre-oxidizing temperature to the graphitizing temperature.

* * * * *